US012781824B2

(12) United States Patent
Randsberg

(10) Patent No.: US 12,781,824 B2
(45) Date of Patent: Nov. 3, 2026

(54) WOODEN SPRING, A METHOD AND A HELICAL DRYER FOR MAKING THE WOODEN SPRING, A WOODEN SPRING FABRIC AND A USE OF THE WOODEN SPRING

(71) Applicant: RAIKU Packaging OÜ, Järva county (EE)

(72) Inventor: Rain Randsberg, Tallinn (EE)

(73) Assignee: RAIKU Packaging OÜ, Tallinn (EE)

( * ) Notice: Subject to any disclaimer, the term of this patent is extended or adjusted under 35 U.S.C. 154(b) by 279 days.

(21) Appl. No.: 18/036,113

(22) PCT Filed: Nov. 12, 2021

(86) PCT No.: PCT/EP2021/081606
§ 371 (c)(1),
(2) Date: May 9, 2023

(87) PCT Pub. No.: WO2022/101457
PCT Pub. Date: May 19, 2022

(65) Prior Publication Data
US 2024/0019010 A1 Jan. 18, 2024

(30) Foreign Application Priority Data
Nov. 12, 2020 (EE) ................................ P202000015
Nov. 13, 2020 (EE) ................................ P202000017

(51) Int. Cl.
*F16F 1/364* (2006.01)
*A47C 27/06* (2006.01)
(Continued)

(52) U.S. Cl.
CPC ............... *F16F 1/364* (2013.01); *B27H 1/00* (2013.01); *A47C 27/065* (2013.01); *A47H 23/08* (2013.01);
(Continued)

(58) Field of Classification Search
CPC ... F16F 3/0876; F16F 2238/026; B27L 11/00; B27D 1/086; B27J 1/00; B27H 1/00;
(Continued)

(56) References Cited

U.S. PATENT DOCUMENTS 2,321,790 A * 6/1943 Bass .................... A47C 27/065
5/255
2,457,504 A 12/1948 Snoke
(Continued)

FOREIGN PATENT DOCUMENTS

| | | | | | |
|---|---|---|---|---|---|
| CN | 2704460 | Y | | 6/2005 | |
| EP | 1048248 | A1 | * | 11/2000 | ........... A47C 27/148 |
| EP | 2002759 | A1 | * | 12/2008 | ........... A47C 27/065 |
| GB | 1153801 | A | * | 5/1969 | ............. B27L 11/04 |
| HU | 226783 | B1 | * | 10/2009 | |
| JP | 2009240449 | A | | 10/2009 | |
| JP | 3173560 | U | | 2/2012 | |

OTHER PUBLICATIONS

English machined translation of HU—226783-B1, 2--9-10-28.*
“International Search Report for Application No. PCT/EP2021-081606, mailed on May 27, 2022”.

*Primary Examiner* — Nicholas J Lane
*Assistant Examiner* — San M Aung
(74) *Attorney, Agent, or Firm* — ALG Intellectual Property, LLC

(57) ABSTRACT

A wooden spring includes a strip of wood of medium thickness a, medium width b, and stretched length l. The coils of strips of wood are made using a method of making wooden springs with a helical shape, the coils having a mean diameter d and an average pitch s. Medium thickness a is 0.2 to 2 millimeters (mm), medium width b is 1 to 10 mm, stretched length l is 10 to 5000 mm, mean diameter d is 6 to 60 mm, and average pitch s is 4 to 40 mm. A wooden fabric interlaced of wooden springs includes helix shaped strips of wood. The wooden springs are interlaced with at least two side by side wooden springs to form a wooden spring fabric.

20 Claims, 14 Drawing Sheets

(51) Int. Cl.
*A47H 23/08* (2006.01)
*B27D 1/08* (2006.01)
*B27H 1/00* (2006.01)
*B27J 1/00* (2006.01)

(52) U.S. Cl.
CPC ................. *B27D 1/086* (2013.01); *B27J 1/00* (2013.01); *F16F 2238/026* (2013.01)

(58) Field of Classification Search
CPC . B27H 5/00; B65D 81/09; B68G 1/00; A47H 23/08; A47C 23/04; A47C 23/0438; A47C 27/06; A47C 27/062; A47C 27/064; A47C 27/065; A47C 27/20
USPC .......................................................... 267/166
See application file for complete search history.

(56) References Cited

U.S. PATENT DOCUMENTS

| | | | | |
|---|---|---|---|---|
| 4,967,816 | A * | 11/1990 | Postema | B27D 1/083 144/349 |
| 5,332,461 | A * | 7/1994 | Huesler | A47C 23/061 5/236.1 |
| 10,288,139 | B2 | 5/2019 | Vörös | |
| 2015/0226278 | A1* | 8/2015 | Voros | A47C 27/064 144/380 |

* cited by examiner

WOODEN SPRING, A METHOD AND A HELICAL DRYER FOR MAKING THE WOODEN SPRING, A WOODEN SPRING FABRIC AND A USE OF THE WOODEN SPRING

TECHNICAL FIELD

The present disclosure relates generally to the field of packaging materials, more specifically to packaging materials and insulating materials made of strips of wood and to the methods of making a strip of wood packaging materials.

BACKGROUND

Wooden wool, which consists of long and thin wooden chips chaotically stacked on top of each other, is widely known in the world as the packaging filling material. Patent application JP2009240449A describes the use of helically twisted wood chips having a thickness of 50500 μm, preferably 50-150 μm, a stretched-out length 1-5 cm and a width preferably 1-10 mm. Twisted wood chips get their spiral twisted shape from wood chips during cutting. The pitch of such wood chips varies along the chip and is not equal in different parts of the chip, also the diameter of the cross-section is different in different parts of the wood chip. Thus, such wood chips are not suitable for making fabric like material.

Wooden wool has historically been used to protect fragile items, mainly as a filling material for packages, but nowadays it is used relatively little and mainly for its decorative nature, as it provides uneven and limited protection and during handling generates a lot of waste in the form of crumbling wooden wool particles and needs gloves during handling, as the edges of the wooden wool may be cut when the wood wool is torn.

In addition, it takes a lot of wooden wool in weight, because to make the wooden wool easier to handle, the wood is cut into thin chips. Cutting the wood in turn, loses the strength of the wood.

For the reasons listed above, package-based pellets, blister film or modifications thereof are mainly used as packaging fillers today, but there is a global trend to reduce the use of plastics and move towards the use of biodegradable materials, so there is a need for easy-to-handle and low-cost biodegradable packaging fillers.

Wooden wool, packaging pellets and bubble wrap have an important additional disadvantage, namely that they take up a lot of space physically, which makes them expensive to transport and store. Today, bubble wrap or its modifications are mainly used to surround and fill packaging items, but there is a global trend to reduce the use of plastic and move towards the use of biodegradable packaging materials, so there is a need for novel, low cost and biodegradable bubble wrap. The bubble wrap has a significant drawback, the bubble wrap physically takes up a lot of space, which makes it expensive to transport and store.

SUMMARY

An aim of the present disclosure is to provide a packaging material and method of making the packaging material that overcomes the problems encountered in prior art. An aim of the present disclosure is to provide an easy-to-use, yet inexpensive, wood biodegradable package filler that makes the most of the strength of the wood and which, in addition, would take up less space during transportation and storage.

In order to achieve the aim of the present disclosure, a package filler and a method of making the package filler from wooden springs with novel shapes and features that facilitate handling. An aim of the present disclosure is to provide a novel biodegradable fabric material having bubble plastic like physical protection properties, which is as easy to use as the bubble plastic film and which producing cost is the same or cheaper than the bubble film and which when rolled up takes less space and thus has lower transport and storage costs than the bubble film. In order to achieve the aim of the present disclosure, the inventor provides a novel fabric material comprising wooden springs having helical coils and cross-sectional shape, wherein the wooden springs are interlaced with each other, the wooden springs are interlaced with at least two side by side wooden springs to form a wooden spring fabric.

In one aspect, an embodiment of the present disclosure provides a wooden spring formed of a strip of wood, wherein the wooden spring comprises a helix having a first end and a second end, wherein the first end has diameter d2 and the second end has diameter d3, and plurality of coils between the first end and second end of the helix, wherein an average thickness a of the helix is 0.2-2.0 millimeters (mm); an average width b, b2 of the helix is 1-10 mm; an average diameter d of the coil is 6-60 mm; an average pitch s of the coil is 4-40 mm; and a stretched-out length l of the wooden spring is 10-5000 mm.

In another aspect, an embodiment of the present disclosure provides a helix dryer for making a wooden spring comprises a tubular spring forming means having a first end and a second end, a heat source adapted to heat the tubular spring forming means, a drive mechanism adapted to drag a strip of wood along the tubular spring forming means to wind the strip of wood into a wooden spring.

In a third aspect, an embodiment of the present disclosure provides a method for making a wooden spring comprises cutting from a wood material a strip of wood; feeding a first end of the strip of wood into a helix dryer pre-heated to 60-300 degrees Celsius; drying the strip of wood at least partially, by dragging the strip of wood at least partially along a tubular spring forming means of the helix dryer.

In a fourth aspect, an embodiment of the present disclosure provides a wooden spring fabric comprising the wooden springs according to the embodiments of the present disclosure, wherein two or more side by side wooden springs are interlaced to each other through the coils of the wooden springs.

In a fifth aspect, an embodiment of the present disclosure provides a use of the wooden springs according to the embodiments of the present disclosure for packing material, for package filling material, for packaging, for making a curtain, for making a mattress, for making an interior or design elements.

Embodiments of the present disclosure eliminate the aforementioned problems in the prior art, and enable to provide a biodegradable material for packing material, for package filling material, for packaging, for making a curtain, for making a mattress, for making an interior or design elements. Additional aspects, advantages, features and objects of the present disclosure would be made apparent from the drawings and the detailed description of the illustrative embodiments construed in conjunction with the appended claims that follow.

BRIEF DESCRIPTION OF THE DRAWINGS

For the purpose of illustrating the present disclosure, exemplary constructions of the disclosure are shown in the drawings, with reference to the following diagrams wherein figure.

DETAILED DESCRIPTION OF EMBODIMENTS

Figure 2:
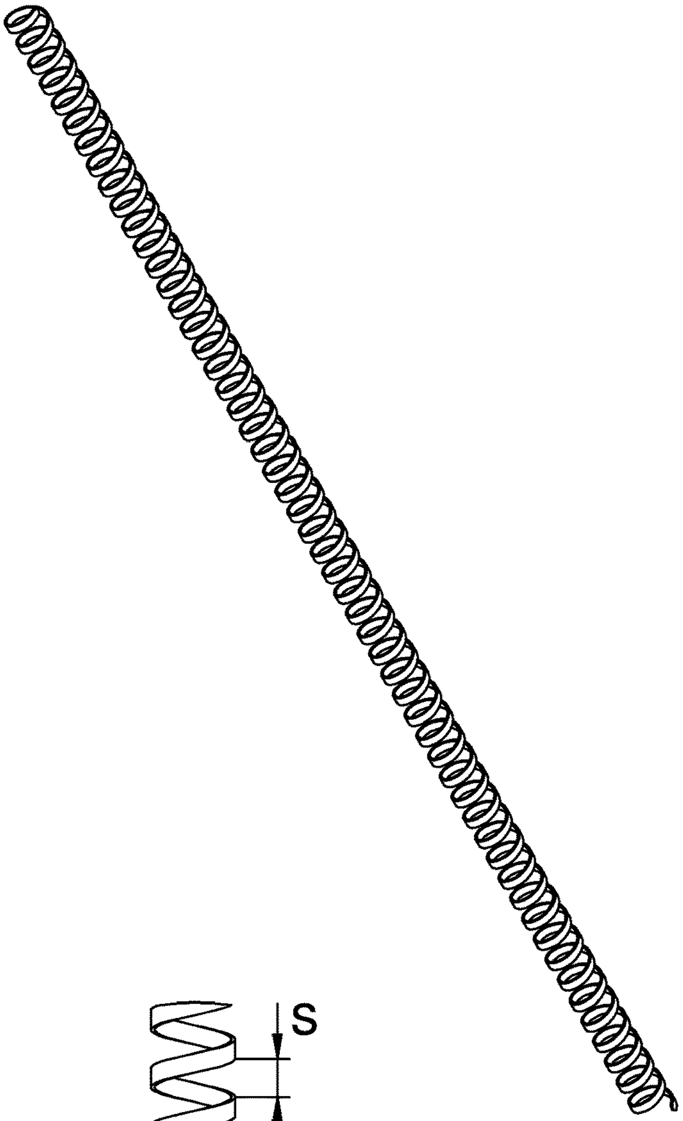
FIG. 2 shows an isometric view of the first embodiment of the wooden spring.
Figure 3:
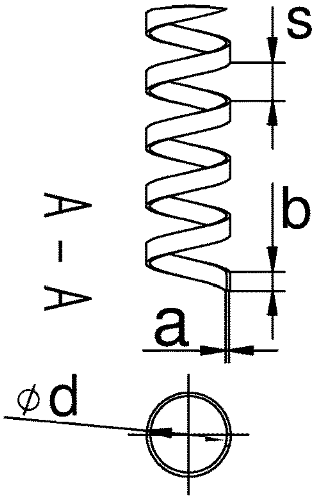
FIG. 3 shows an enlarged plan view of a section of the wooden spring according to the first embodiment with an end view.
Figure 1:
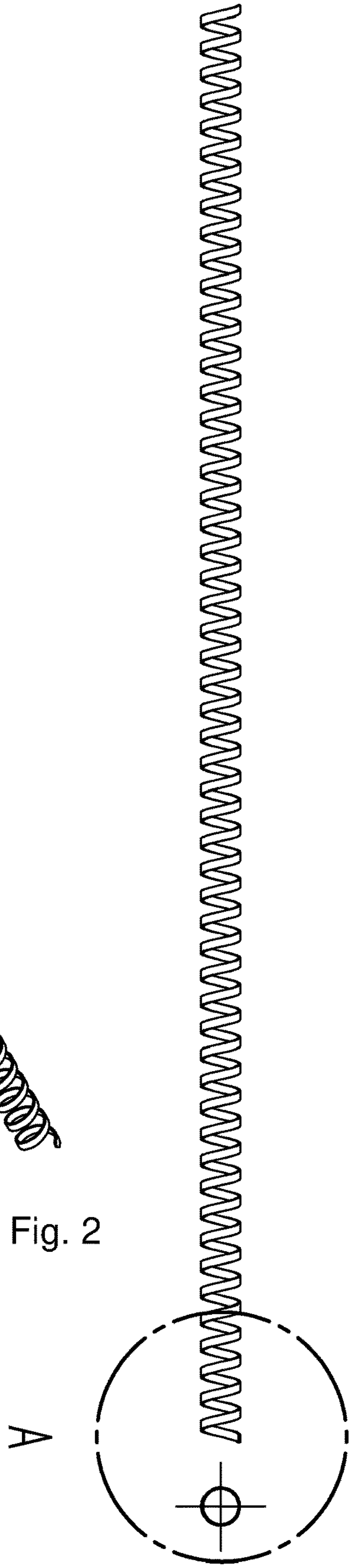
FIG. 1 shows a first embodiment of a wooden spring in a top view with end view.

The following detailed description illustrates embodiments of the present disclosure and ways in which they can be implemented. In one aspect, an embodiment of the present disclosure provides a wooden spring formed of a strip of wood, wherein the wooden spring comprises a helix having a first end and a second end, wherein the first end has diameter d2 and the second end has diameter d3, and plurality of coils between the first end and second end of the helix, wherein an average thickness a of the helix is 0.2-2.0 mm; an average width b, b2 of the helix is 1-10 mm; an average diameter d of the coil is 6-60 mm; an average pitch s of the coil is 4-40 mm; and a stretched-out length l of the wooden spring is 10-5000 mm.

The dimensions of the wooden springs can vary widely, depending on the intended use of the fabric and the need for strength. The average diameter of the coils of wooden springs d is preferably in a range from 8 to 16 mm. The average pitch s of the coils of wooden springs is preferably in the range of 7-14 mm. According to the embodiments of the present disclosure the dimensions of the wooden spring may be as follows.

The average thickness a of the helix thus can be from 0.2, 0.25, 0.3, 0.35, 0.4, 0.45, 0.5, 0.55, 0.6, 0.65, 0.7, 0.75, 0.8, 0.85, 0.9, 0.95, 1.0, 1.05, 1.1, 1.15, 1.2, 1.25, 1.3, 1.35, 1.4, 1.45, 1.5, 1.6, 1.65, 1.7, 1.75. 1.8, 1.85, 1.9 or 1.95 mm up to 0.25, 0.3, 0.35, 0.4, 0.45, 0.5, 0.55, 0.6, 0.65, 0.7, 0.75, 0.8, 0.85, 0.9, 0.95, 1.0, 1.05, 1.1, 1.15, 1.2, 1.25, 1.3, 1.35, 1.4, 1.45, 1.5, 1.6, 1.65, 1.7, 1.75. 1.8, 1.85, 1.9, 1.95 or 2.0 mm. The average width b, b2 of the helix thus can be from 1, 1.5, 2, 2.5, 3, 3.5, 4, 4.5, 5, 5.5, 6, 6.5, 7, 7.5, 8, 8.5, 9 or 9.5 mm up to 1.5, 2, 2.5, 3, 3.5, 4, 4.5, 5, 5.5, 6, 6.5, 7, 7.5, 8, 8.5, 9, 9.5 or 10 mm. The average diameter d of the coil thus can be from 6, 8, 10, 12, 14, 16, 18, 20, 22, 24, 26, 28, 30, 32, 34, 36, 38, 40, 42, 46, 48, 50, 52, 54, 56 or 58 mm up to 9, 12, 15, 18, 21, 24, 27, 30, 33, 36, 39, 42, 45, 48, 51, 54, 57 or 60 mm. The average pitch s of the coil thus can be from 4, 6, 8, 10, 12, 14, 16, 18, 20, 22, 24, 26, 28, 30, 32, 34, 36 or 38 mm up to 6, 8, 10, 12, 14, 16, 18, 20, 22, 24, 26, 28, 30, 32, 34, 36, 38 or 40 mm. The stretched-out length l of the wooden spring thus can be from 10, 100, 200, 300, 400, 500, 600, 700, 800, 900, 1000, 1200, 1400, 1600, 1800, 2000, 2200, 2400, 2600, 2800, 3000, 3200, 3400, 3600, 3800, 4000, 4200, 4400, 4600 or 4800 mm up to 50, 150, 250, 350, 450, 550, 650, 750, 850, 950, 1250, 1500, 1750, 2000, 2250, 2500, 2750, 3000, 3250, 3500, 3750, 4000, 4250, 4500, 4750 or 5000 mm.

The length of the strip of wood to be processed to the wooden spring, depending on the wood material from which the strip of wood is cut and a purpose of the use of the wooden spring, may be from few millimeters to the 5-6 meters. E.g., to obtain a wooden spring having free length of about 40 cm, a strip of wood of 1.3 meters may be used when a tubular spring forming means having diameter of about 8 millimeters is used.

In an embodiment of the wooden spring, the wooden spring comprises at least one of the following a distance of the first end or the second end from a first coil is less than the average pitch; the first end is at least partially turned onto an outer side of the wooden spring; the second end is at least partially turned onto an outer side of the wooden spring; the first end is at least partially turned onto an inner side of the wooden spring; the second end is at least partially turned onto an inner side of the wooden spring. Such different positions of the first end and the second of the wooden spring allow better use of the wooden springs in packaging and package filling. I.e., in order to make the ends of wooden springs safer, to avoid getting stuck in each other with ends and to make the appearance of wooden springs more correct, the ends of the wooden springs are turned next to the coils, i.e., the distances from the ends of the wooden spring to the coil of the wooden spring next to the end is less than the average length of the pitch of the wooden spring.

According to alternative solutions of the ends of the wooden spring, the lower end of the wooden spring is partially turned on the outside of the wooden spring, or the upper end of the wooden spring is turned on top of the inner side of the previous wooden spring. Such different positions of the first end and second end of the wooden spring can be achieved by after obtaining the wooden spring from the helix dryer, the corresponding end of the wooden spring is gripped between the pliers and bent to the desired position, at the same time the bent end of the wooden spring is compressed and heated to deform the wood and to retain corresponding shape of the end of the wooden spring. Thus, in a fourth aspect, the wooden springs made by using the helix dryer and method of the present disclosure, in an embodiment can be used for packing material, for package filling material, for packaging, for making a curtain, for making a mattress, for making an interior or design elements.

According to an embodiment, a filling material of the wooden spring package comprises wooden springs formed of helix shaped strips of wood having an average thickness a, an average width b and stretched out length l, wherein instead or preparing the wooden chips by cutting, the wooden springs are made using a method of making wooden springs similar to the screw line, medium diameter d and the average pitch of the coils s, instead of those produced by cutting the strips; a—0.2-2 mm, b—1-10 mm, 1-10-5000 mm, d—6-60, s—4-40 mm.

In order to save storage and transport space, the wooden springs are packaged by compressed at the ends in the longitudinal direction of the wooden springs. To facilitate the transport and storage of the wooden springs, the wooden springs are compressed at the ends and packed in a package shorter than the free length of the wooden springs, which saves 1.5-3 times space.

In another aspect, an embodiment of the present disclosure provides a helix dryer for making a wooden spring comprises a tubular spring forming means having a first end and a second end, a heat source adapted to heat the tubular spring forming means to 60-300 degrees Celsius, a drive mechanism adapted to drag a strip of wood along the tubular spring forming means to wind the strip of wood into a helix. In the present disclosure the term “helix dryer” refers to a device configured to provide a shape of helix to a strip of wood and which maintains and dries the helix of a strip of wood during the drying of the strip of wood.

The tubular spring forming means may be in a form of a pipe shape, a shaft or a hollow shaft being arranged to provide to the strip of wood a helical shape when the tubular spring forming means is heated by the heat source to obtain the wooden spring. To fasten the production process of the wooden spring the tubular spring forming means may be pre-heated by the heat source to 60-300 degrees Celsius. The temperature of the helix dryer is at least 60 degrees Celsius, e.g., 90-250 degrees Celsius, 80-300 degrees Celsius, preferably 110-200 degrees Celsius. The best results are obtained when drying at a temperature of 100-150 degrees Celsius. Using such draying temperature range, there is no risk of darkening the wood surface. If the drying temperature more than 200 degrees Celsius is used, the surface of the wood may become considerably darker for some types of wood. Thus, in order to speed up the drying process but at the same time prevent the wood surface from darkening, a drying temperature of 150-180 degrees Celsius is preferred. The temperature of the helix dryer thus can be from 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290 or 295 degrees Celsius up to 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295 or 300 degrees Celsius. The drying of the strip of wood to be formed to the wooden spring takes place during forming the shape of the strip of wood. Alternatively, or additionally, the drying may be performed after obtaining the shape of the wooden spring.

Alternatively, or optionally, other drying methods may be used to achieve additional effects. Such drying methods may e.g., following. Using a microwave drying enables to dry the strips of wood inside, this drying method further allows to increase the speed of drying process without burning the strips of wood. Using a vacuum drying enables to decrease the boiling point of moisture of the wood and drying takes place more intensively. Using conductive drying is more effective for drying veneer. One type of conductive drying is high-frequency drying, wherein the material is placed between electric plates, where high-frequency oscillations occur. As a result, heat begins to build up inside the material. Another type of conductive drying is radiation drying, in which heat is transferred to a material by radiation. During drying in the helix dryer, the content of moisture is dried up to 0.001%-7%, preferably 0.5-5%.

In an alternative embodiment, the helix dryer further comprises a feeder of the strip of wood. When feeding the strip of wood into the feeder of the strip of wood, the feeder of the strip of wood is configured to press the end of the strip of wood between the belt and the bottom of the helical groove, and the belt starts with frictional force to drag the strip of wood along the helical groove.

In an embodiment, the tubular spring forming means comprises a helical groove formed on an outer surface of the tubular spring forming means. The helical groove has a rectangular cross-section. The helical groove may be formed by turning or milling.

In an embodiment, the heat source is adapted to heat the tubular spring forming means at least from inside of the tubular spring forming means or outside the tubular spring forming means. The heat source for heating the tubular spring forming means can be a heated electrode inside the tubular spring forming means or a boiler device circulating the heat of burning wood residues as hot gas, steam or liquid inside the tubular spring forming means. Alternatively, or additionally, the heat source may be a flow of hot gas or steam directed towards the tubular spring forming means.

In an embodiment, wherein the drive mechanism comprises one or more transmission means attached around the tubular spring forming means and a drive adapted to move the one or more transmission means along the spring shape forming means. Optionally, the drive mechanism of the helix dryer may further comprise a tensioning mechanism adapted to tension the transmission means (e.g., a belt tensioning mechanism for tensioning belt transmission) and a guide for guiding the transmission means (e.g., a belt guide).

In an embodiment, the one or more transmission means may be a belt, such as a flat belt, a toothed belt or a V-belt. The belt may be wrapped around the bottom of the helical groove of the tubular spring forming means. Cams with a higher hardness than the belt material may be attached to the sides of the belt and to the sides of the helical groove to reduce the wear and friction of the belt between the bottom and sides of the helical groove of the tubular spring forming means. In order to increase the drying speed of the helix dryer, the helix dryer may comprise more than one more transmission means, e.g., belts in succession, and during drying the strip of wood to be dried the strip of wood dragged forward by a plurality of belts in succession. The bottom and sides of the helical groove of the tubular spring forming means may be polished to reduce friction between the belt and the bottom and sides of the helical groove. Instead of using the belt, a chain can be used as the one or more transmission means to allow the strip of wood to dry at temperatures higher than the melting temperature of the belt material.

In an embodiment, the helix dryer further comprises sanding mechanism to enable according to the method of the present disclosure sanding surfaces of the strips of wood or sanding surfaces of the wooden spring. The sanding mechanism may additionally comprise a sanding groove, wherein a shape of the sanding groove is adapted to the shape of the cross-section of the strip of wood.

In an embodiment, the drive mechanism is configured to drive the belt along the helical groove. Then the tubular spring forming means of the helix dryer is preheated with the heat source to 130-180 degrees Celsius, preferably to 150-170 degrees Celsius. When the temperature of the tubular spring forming means has reached to at least 60 degrees Celsius, the first end of the strip of wood is fed into the helical groove between the belt and the bottom of the helical groove and the belt begins to pull the strip of wood along the helical groove. During the same time the pre-heated tubular spring forming means heats and dries the strip of wood. As a result of heating and drying, the strip of wood obtained in the shape of a cylindrical helix and the strip of wood in the shape of wooden spring exits the end of the tubular spring forming means of the helix dryer. Another way to prevent side by side wooden springs from getting into each other, is to prepare wooden springs in such a way that the average width of the coil of the wooden spring b2 is greater than the average distance between the coils of the wooden spring c2 being side by side. The third way to prevent side by side wooden springs from getting into each other is to prepare wooden springs in such a way that the length of the wooden spring pitch is variable in the longitudinal direction of the wooden spring.

In order to allow several wooden springs to be added successively to each other, at least one average diameter d2 of the part of the end of the wooden spring is smaller in absolute than the average diameter of the wooden spring d1, and the part of the end of the wooden spring having the smaller average diameter d2 is partially pushed into the part of the end of the wooden spring having the average diameter d1. In this way, 2-1000 wooden springs can be connected in series, which in the case of a longer composite wooden spring are, for example, wound into a roll, and the user can easily separate sections of the timber spring by pulling. In an embodiment of the wooden spring, the average diameter d2 may be also smaller than the average diameter d3. This enables more efficiently to join the wooden springs to each other by inserting the one end of the one wooden spring having smaller diameter into the second end of the second wooden spring having bigger diameter. At the same time the wooden springs joined together are also detachable from each other by pulling.

In an embodiment, the wooden spring comprises one or more breaking markers. The breaking marker may be an incision cut on the side of the wooden spring, a visual marking or both an incision and visual marking. The incision may be V-shaped. The visual marking may be colored or burnt. In order to allow the accessibility of wooden springs to be broken into sections of wooden springs of the desired length, at least one partial incision has been made on the side of the wooden spring to facilitate the breaking of the wooden spring, and that at least one visually distinguishing mark has been made on the side of the wooden spring to indicate the incision facilitating the breaking of the wooden spring.

A wooden spring fabric material can be formed of wooden springs having different cross-sectional shape. The cross-sectional shape of the wooden spring according to the present disclosure may be circular, elliptical, chain-linked shaped, wherein the chain-linked cross-sectional shape comprising two semicircular sections A having radius R, wherein the two semicircular sections are connected from the ends with two intermediate line segments B.

The wooden springs can be made of any wood, preferred are the types of wood from which the veneer and plywood is made. E.g., due to its color and price, aspen and birch are especially suitable. Aspen is also softer than birch, thus can be used without soaking or moisturizing. In case birch is preferred then soaking enables to achieve wooden springs having better quality. If the raw wooden material used for making the wooden springs is not dried then soaking may not be needed. However, soaking improves e.g., flexibility and formability of the strip of wood to be formed to the wooden spring and the wooden spring to be obtained has better quality and more homogenous shape. Similarly, the wooden springs may be made of any other at least partially woody herb, such as bamboo, reed, etc. The wooden springs may be made of the strips of wood directly cut from the wooden material or the wooden material may be processed into the veneer and then the strips of wood used for making the wooden springs are cut from the veneer. E.g., about 1 square meter of veneer enables to obtain about 1 square meter of wooden spring fabric. As e.g., aspen is softer then sanding or polishing may not be needed.

In a third aspect, an embodiment of the present disclosure provides a method for making a wooden spring comprises cutting from a wood material a strip of wood; feeding a first end of the strip of wood into a helix dryer pre-heated to 60-300 degrees Celsius; drying the strip of wood at least partially, by dragging the strip of wood at least partially along a tubular spring forming means of the helix dryer.

For a greater strength, the wood is cut into strips of wood as possibly in the direction of wood fibers. When the veneer is cut, it cools down, which reduces the flexibility properties. To increase the flexibility of the strips of wood, the strips of wood are soaked in water at 70-100 degrees before being fed into the helix dryer. The strips of wood may be made from the wood material such as wooden blocks. The wooden blocks are pre-soaked, the pre-soaked wooden blocks are cut into veneer boards, the veneer boards are cut into strips of wood along the wood fibers. The moisture content of the wood may be increased about up to 30% to the maximum moisture content of the corresponding wood, e.g., up to 60%-120%. In order to use and recover veneer and plywood waste, the strips of wood are cut from veneer or plywood waste.

In an embodiment, the method comprises pre-moistening the wood material. The pre-moistening may be carried out by soaking the wood material in a water or in an aqueous solution comprising components that change or improve the properties of wood, or provide additional the properties to the wood material or the pre-moistening may be carried out by steam treatment. Optionally, instead of or in addition to the pre-moistening, the method may comprise post-moistening.

Pre-soaking or additional soaking may be needed if the wooden material is not moisturized before cutting the strips of wood. Instead of additional soaking, it is more efficient to use steaming. The heat and humidity applied by the steam treatment of the wooden springs make the wooden spring flexible, which makes it easier to shape the wooden spring or to shape the ends of the wooden spring.

In an embodiment, the method comprises automatically determining a category of the strip of wood, controlled by a machine vision system, wherein the determining comprises obtaining a digital information of the strip of wood by photographing the strip of wood; analyzing the digital information in an automated sorting system by a machine vision; based on the analyzed the digital information, allocating to the strip of wood one or more categories and sorting the strip of wood based on the allocated one or more categories, by the automated sorting system. Alternatively, the step of categorization may be carried out after obtaining the wooden string.

Determining the quality of the strip of wood enables to detect e.g., the quality of the strip of wood and at first sort out those strips of wood which are not suitable for making the wooden springs, and secondly to sort the strips of wood into quality groups based on the determined parameters and purpose of use of the wooden springs to be obtained. Such criteria to be detected by the machine vision system can be e.g., wood structure failures, absence or number of knots, cracks, curvature, fungal damage, oblique fibers, and other failures. Other types of quality parameters that can be determined by the machine vision system are e.g., related to the physical parameters such as thickness, length, cross-sectional shape, color. Third type of quality criteria to be determined by the machine vision system is the surface roughness of the strip of wood. This enables to decide whether the strip of wood or the wooden spring to be obtained needs any sanding or polishing to make the surface smoother.

Automated sorting is used to sort out unsuitable strips of wood and to sort the strips of wood by quality according to, for example, color, size and number of loose wood fibers, and so on. The sorting process of the strips of wood can take place after the strips of wood have been cut or at any time after the wooden strips have been cut, for example after sanding the strips of wood or after removing the finished wooden springs from the dryer or before packing.

According to an embodiment of the present disclosure, a method of making a wooden spring, wherein the method comprises steps of soaking a wood in a water; processing the soaked wood into strips of wood; sanding surfaces of the strips of wood; directing the sanded strips of wood into a wooden spring shaped helix dryer at least 60 degrees Celsius; drying the sanded strips of wood at least partially in the helix dryer; removing the at least partially dried strips of wood from the helix dryer.

The method may optionally further comprise sorting the strips of wood automatically, controlled by a machine vision system, into at least two quality categories, wherein, the strips of wood are photographed digitally; analyzing a digital information of the digitally photographed strips of wood in an automated sorting system by a machine vision; sorting the strips of wood into the at least two different quality categories by the automated sorting system.

In another embodiment according to the present disclosure a method of making wooden spring, wherein the strips of wood are cut from veneer and after obtaining the veneer strips, automatic sorting is used to sort the veneer strips, the method comprising following steps: soaking a wood in a water; cutting the wood into veneer; cutting strips of wood from the veneer; strips of wood are photographed digitally; analyzing a digital information of the digitally photographed strips of wood in an automated sorting system by a machine vision; sorting the strips of wood into the at least two different quality categories and into a waste by the automated sorting system; sanding surfaces of the strips of wood; directing the sanded strips of wood into a wooden spring shaped helix dryer at least 60 degrees Celsius; drying the sanded strips of wood at least partially in the helix dryer; after the at least partial drying, when the strips of wood retain at least the desired shape given by the helix dryer, leading the obtained wooden springs out from the helix dryer; post-drying the wooden springs; packaging the wooden springs.

To prevent side by side wooden springs from getting into each other, the helix of some wooden springs is right-handed, and the helix of some wooden springs is left-handed.

In a fourth aspect, an embodiment of the present disclosure provides a wooden spring fabric comprising the wooden springs according to the embodiments of the present disclosure, wherein two or more side by side wooden springs are interlaced to each other through the coils of the wooden springs. The wooden springs may be interlaced in a single layer to form the wooden spring fabric according to the present disclosure. In such embodiments the wooden spring fabric is flexible and has excellent properties for packaging, package filling material, packing material, etc. Alternatively, to obtain stronger properties of the wooden spring fabric, according to an embodiment, the wooden springs may be interlaced so that the interlaced wooden springs form a multi layered and/or multi columnar wooden spring fabric.

First, the wooden spring fabric is formed of wooden springs having circular cross-sectional shape. The term "circular cross-sectional shape" referring to an alternative embodiment in the present disclosure means that the cross-section of the wooden springs is circular.

Second, the wooden spring fabric is formed of wooden springs having a cross-section which has an elliptical shape in the direction of the longer semiaxis of the longer side of the wooden fabric material. The term "elliptical cross-sectional shape" referring to an alternative embodiment in the present disclosure means that the cross-section of the wooden springs is elliptical in the direction of the longer semiaxis of the longer side of the wooden fabric material. The dotted line k2 illustrates the imaginary longer side of the fabric material. The use of wooden springs having an elliptical cross-sectional shape increases the length of the fabric material at the same amount of material, secondly reduces the thickness of the wooden spring fabric, and thirdly makes the side surface of the wooden spring fabric in the direction of the normal of the side surface elastically deformable and more easily compressible.

Thirdly, the wooden spring fabric is made of wooden springs having chain link shaped cross-section. I.e., comprising two semicircular sections A having radius R, wherein the two semicircular sections are connected from the ends with two intermediate line segments B. The term "chain link shaped cross-section" referring to an alternative embodiment in the present disclosure means that the cross-section of the wooden springs comprises two semicircular sections A having radius R, wherein the two semicircular sections are connected from the ends with two intermediate line segments B. The use of wooden springs having the chain link shaped cross-section first increases the length of the fabric material to the maximum at the same amount of material, secondly reduces the thickness of the wooden spring with the maximum amount of material and thirdly makes the fabric material maximally collapsible in the longitudinal direction to save space during transport and storage.

The wooden springs according to the present disclosure can be interlaced into each other by the coils of the wooden springs to form the wooden fabric material, wherein different interlacing positions of the wooden springs can be used.

According to the embodiments of the present disclosure, the axes of the wooden springs in respect of the side of the wooden fabric may be at angle α 70-115 degrees or angle β 25-65 degrees or alternatively the axes of the wooden springs may be oriented in the direction of the longer side of the wooden fabric or oriented in the direction of the normal n of the side surface of the wooden spring fabric.

A first alternative position for interlacing the wooden springs is cross braiding. I.e., the term "cross braiding" means that the axes s1 of the wooden springs are at an angle α in respect of the side of the wooden spring fabric, wherein the angle α is 70-115 degrees, preferably 85-90, 85-95 or 88-90 degrees. The dotted line k1 illustrates the imaginary side of the fabric material. The use of cross-braiding makes the wooden spring fabric in the longitudinal direction easy to roll and to be partially foldable and not foldable.

Another position for interlacing the wooden springs is inclined braiding, i.e., the axes s3 of the wooden springs are at an angle β in respect of the side of the wooden spring fabric, wherein the angle β is of 25-65 degrees or 30-60 degrees, preferably 40-50 or 42-48 degrees. The dotted line k3 illustrates the imaginary side of the fabric material. The first advantage of inclined braiding is that no wood debris is formed when the wooden spring fabric is cut perpendicular to the edge of the wooden spring fabric. Another advantage of inclined braiding is that when the wooden spring fabric is wrapped in a square shape around the sides of an object to be protected, the wooden spring fabric has similar bending and movement properties with respect to the sides of the object to be protected.

A third position for interlacing the wooden springs is longitudinal braiding. I.e., the axes s4 of the wooden springs are oriented in the direction of the longer side of the wooden spring fabric. The dotted line k4 illustrates the imaginary side of the fabric material. The use of longitudinal braiding makes the wooden spring fabric easy to roll and in the direction of the shorter side to be partially foldable and unfoldable.

The fourth position for interlacing the wooden springs is normal braiding. I.e., the axes s5 of the wooden springs are oriented in the direction of the normal n of the side surface of the wooden spring fabric, and the wooden springs are interlaced with at least four side by side wooden springs. The dotted line k5 illustrates the imaginary side of the fabric material. The use of a normal braiding makes the side surface of the wooden spring fabric material in the direction of normal n elastically deformable and easily compressible, thus being suitable for fixing the objects to be packed inside the package and filling the empty space inside the package.

In order to tint the wooden springs, the wooden springs are covered with a layer of a toning agent. To obtain lighter tone wooden springs, the strips of wood or wooden springs are bleached or the wooden springs are covered with a layer of white paint or a layer of paint that gives a white tone. In order to protect the wooden springs from moisture, the wooden springs are covered with a protective layer against moisture. To maintain the shape and strength of the wooden springs in a humid environment, the wooden springs can be coated with a layer of varnish, paint, oil or stain. In order to protect the wooden springs from damage to the fungus, the wooden springs are impregnated or covered with a fungicide. To change the color of the wooden springs, the wooden springs are covered with a layer of paint. To change the color of wooden springs e.g., to green, to pink, to yellow, to blue, etc. the wooden springs are covered with a layer of paint or a layer of paint that gives the desired shade. To speed up the process of soaking the wood and increase the flexibility of the wood, the wood is soaked in water at 30-100 degrees, preferably 70-90 degrees.

In the embodiment a temperature of the helix dryer may be in the range of 80°-300° by Celsius or in the range of 110°-200° by Celsius. In an embodiment of the present disclosure a wooden spring comprising a strip of wood, wherein the wooden spring has an average thickness a, an average width b and a stretched-out length l, wherein coils of the wooden spring are formed into a helical shape using the method for making the wooden spring, wherein the coils have an average diameter d and an average pitch s, wherein a is 0.2-2 mm, b is 1-10 mm, l is 10-5000 mm, d is 6-60 mm, s is 4-40 mm.

In an embodiment, the average diameter d may be in a range 6-60 mm, preferably 7-12 mm or 8-16 mm. In an embodiment, the average pitch s may be in a range 4-40 mm or 7-14 mm, preferably 5-10 mm. In an embodiment, the stretched-out length l may be in a range 500-2000 mm or 600-1600 mm. According to an embodiment, a helix of the wooden sprig is right-handed or left-handed. According to an embodiment, an average width b2 of a coil of the wooden spring is greater than the average distance c2 between the coils of the wooden spring being side by side. This enables to prevent the wooden springs from getting into each other when the wooden springs are in use. According to an embodiment, the average pitch s in the longitudinal direction of the wooden spring may be variable. According to the embodiments, the wooden spring may be covered with a layer of moisture protection, a layer of toner or a layer of paint.

According to some embodiments of the present disclosure the wooden spring may further comprise at least one of the following: a distance of an end of the wooden spring from the first turn of the wooden spring is less than the length of the average step of the wooden spring; the end of the wooden spring is at least partially turned onto the outer side of the wooden spring; the end of the wooden spring is at least partially turned on the inner side of the wooden spring.

According to some embodiments of the present disclosure the wooden spring may further comprise at least one of the following: at least one, at least partial incision is made in the sides of the wooden spring to facilitate breaking of the wooden spring; at least one visually distinguishing mark is made on the side of the wooden spring to indicate an incision to facilitate the breaking of the wooden spring.

According to some embodiments of the present disclosure the wooden spring may further comprise at least one average diameter d2 of the part of the end of the wooden spring is smaller in absolute than the average diameter of the wooden spring d1, and the part of the end of the wooden spring having the smaller average diameter d2 is partially pushed into the part of the end of the wooden spring having the average diameter d1.

The wooden spring according to the present disclosure can be packaged by compressing the wooden spring at its ends along the axis of the wooden spring. According to the embodiments of the present disclosure the wooden springs can be interlaced into a wooden fabric. The wooden fabric according to the present disclosure is interlaced of wooden springs comprising helix shaped strips of wood, the wooden springs are interlaced with at least two side by side wooden springs to form a wooden spring fabric. According to an embodiment, the axis of the wooden springs of the wooden fabric are at 70°-115° or 85°-95° angle $\alpha$ in respect of the longer side of the wooden fabric. According to an embodiment, the axis of the wooden springs of the wooden fabric are at 30°-60° or 40°-50° angle $\beta$ in respect of the longer side of the wooden fabric.

In an embodiment, the axes of the wooden springs are oriented to the normal of the side surface n of the wooden fabric material, and the wooden springs are connected to each other by interlacing four side by side wooden springs.

According to an embodiment, the cross-sectional shape of the wooden springs is elliptical and oriented to the longer semiaxis of the longer side of the wooden fabric material made of wooden springs. According to an embodiment, the cross-sectional shape of the wooden springs is chain link shaped comprising two semicircular sections A having radius R, wherein the two semicircular sections are connected from the ends with two intermediate line segments B. According to an embodiment, the cross-sectional shape of the wooden springs is circular.

DETAILED DESCRIPTION OF THE DRAWINGS

FIG. 1-13 show embodiments of the wooden springs. A thickness a of a coils the wooden springs a is 0.2-2.0 mm, preferably 0.4-0.6 mm, width b is 1-10 mm, preferably 3-6 mm, stretched out length l 0.1-5 meters (m), preferably 0.5-2 m. The wooden springs are made in helical, i.e., tension spring shape using the method for making the wooden spring. The outer diameter of the coils of the wooden springs d is 6-60 mm, preferably 7-12 mm and the pitch of the coils of the wooden springs is 4-40 mm, preferably 5-10 mm.

FIG. 4-7 show embodiments of the shapes of the wooden spring that prevent wooden springs being side by side from getting by coils into each other.

Figure 6:
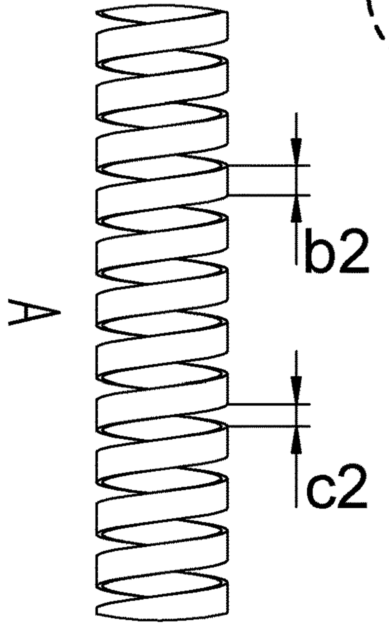
FIG. 6 shows an enlarged sectional side view of the embodiment of the wooden spring having tight pitch coils.
Figure 5:
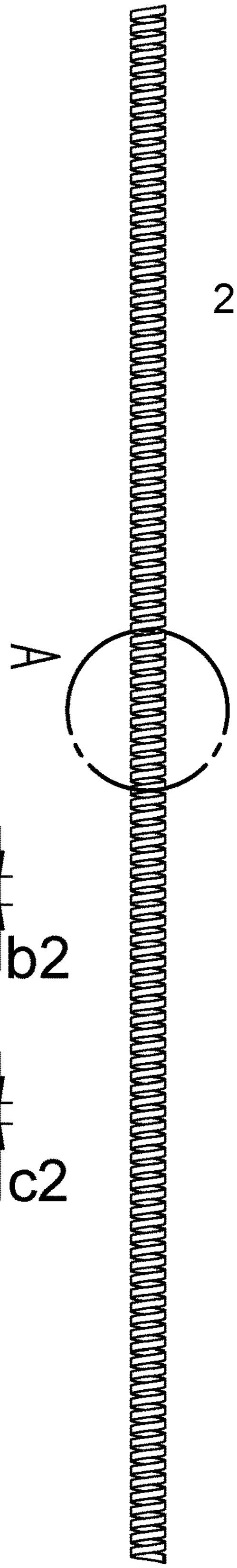
FIG. 5 shows a side view of an embodiment of a wooden spring having tight pitch coils.
Figure 4:
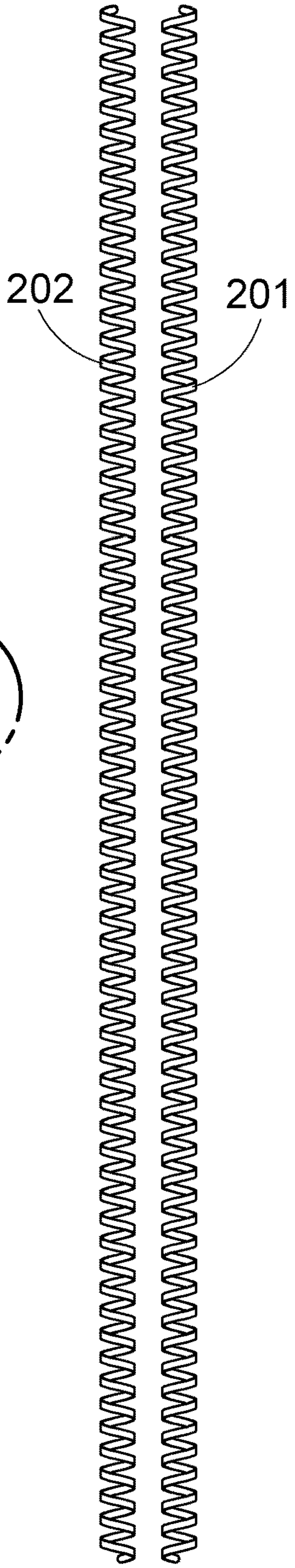
FIG. 4 shows side views of the embodiments of the wooden springs having different coil directions.

FIG. 4 shows the embodiments of the wooden springs having different coil directions, wherein a helix of the wooden spring 201 is right-handed, and a helix of the wooden spring 202 is left-handed FIG. 5-6 show an embodiment of a wooden spring having tight pitch coil. An average width b2 of a coil of the wooden spring is greater than the average distance c2 between the coils of the wooden spring.

Figure 7:
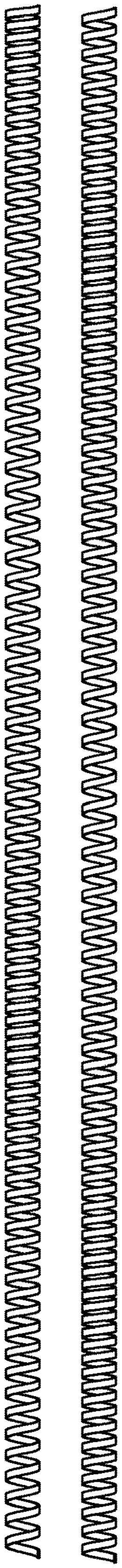
FIG. 7 shows side view of embodiments of wooden springs having different variable pitch lengths.

FIG. 7 shows embodiments of wooden springs having different variable pitch lengths.

Figure 9:
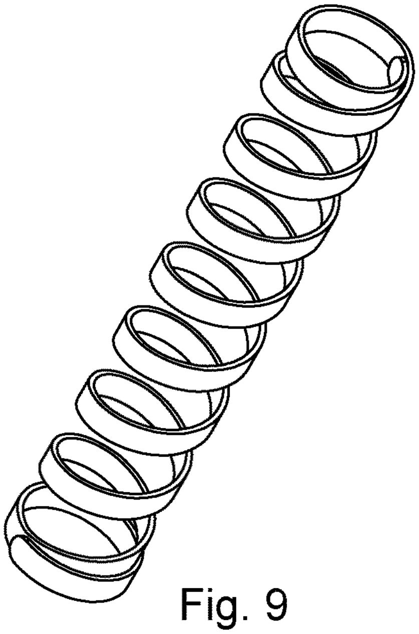
FIG. 9 shows an isometric view of embodiments of a second and third type of a first and a second end of a wooden spring.
Figure 8:
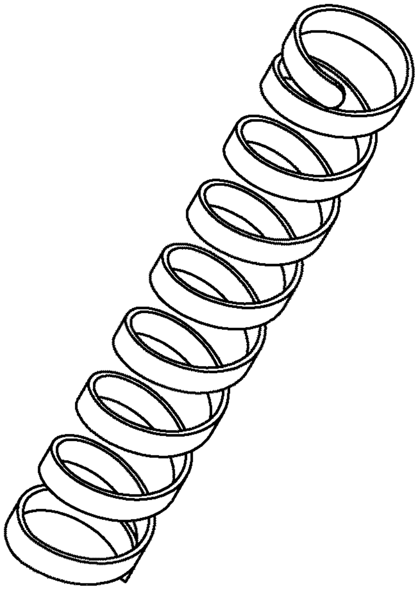
FIG. 8 shows an isometric view of an embodiment of a first type of a first and a second end of a wooden spring.

FIG. 8-9 show three types of ends, which make the ends of the wooden springs safer, prevent the ends from getting stuck into each other and make them look more correct.

FIG. 8 shows a wooden spring having a first type of end, wherein the ends of the wooden spring are turned next to the coils, i.e., the distances from the ends of the wooden spring to the coil of the wooden spring next to the end is less than the average length of the pitch of the wooden spring.

FIG. 9 shows an embodiment of a wooden spring having a second and a third type of end, wherein one end is partially turned onto an inner side of the wooden spring and second end is partially turned onto an outer side of the wooden spring.

Figure 12:
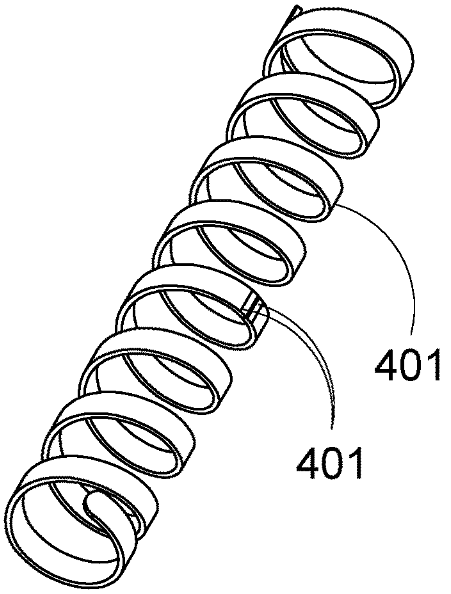
FIG. 12 shows an isometric view of the embodiment of splitting the wooden spring.
Figure 10:
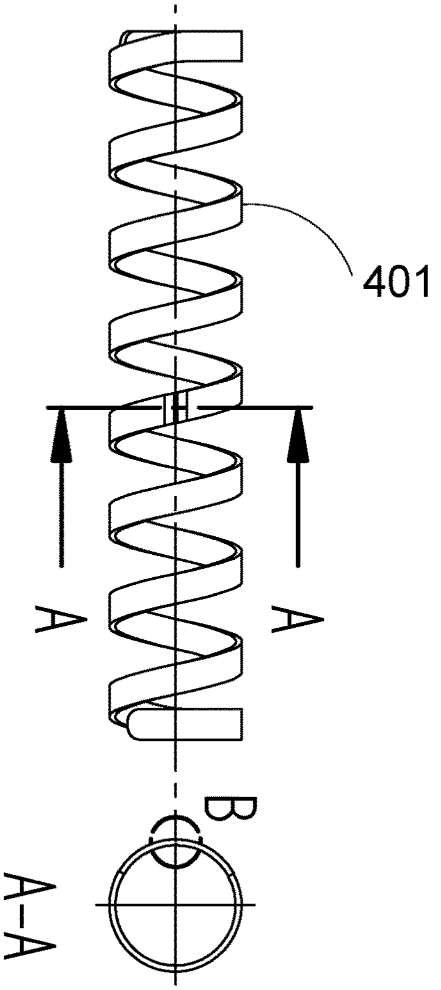
FIG. 10 shows a side of an embodiment of splitting a wooden spring with an end view.
Figure 11:
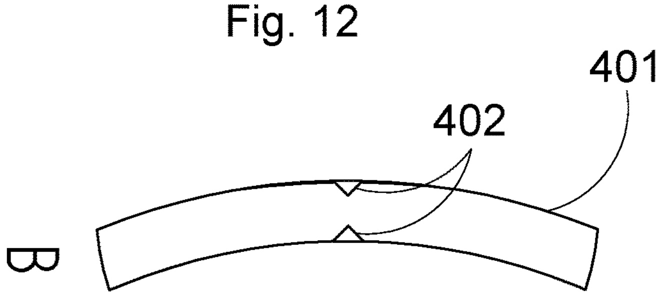
FIG. 11 shows an enlarged sectional end view of the embodiment of splitting the wooden spring.

FIG. 10-12 show an embodiment of a solution for splitting the wooden springs, wherein sides of the wooden spring 401 are provided with V-shaped incisions 402 to facilitate breaking of the wooden spring, which are marked on the outer side of the wooden spring 401 by markings 403 on either side of the incision 402, which may be colored or burnt.

Figure 13:
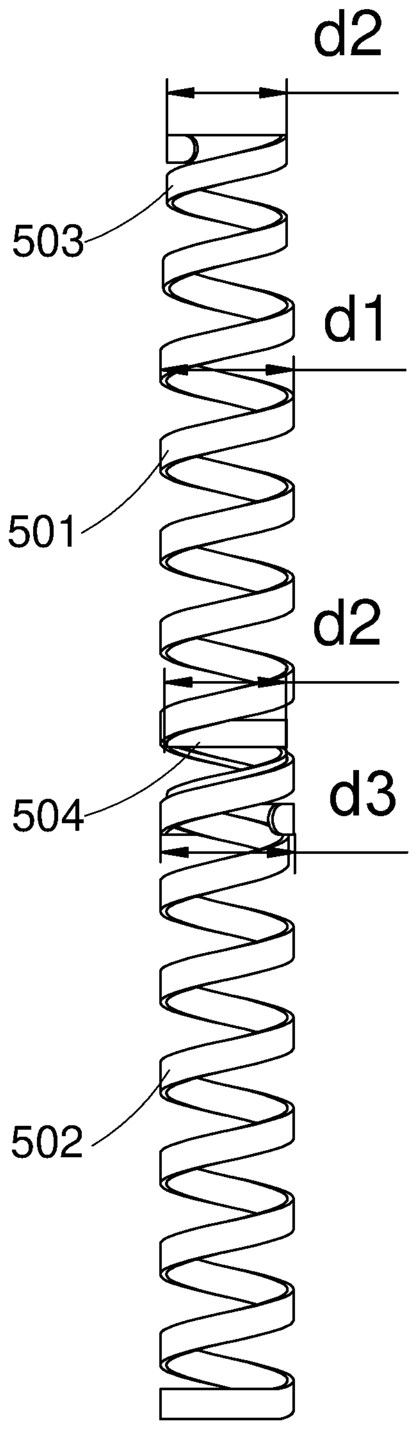
FIG. 13 shows an isometric view of an embodiment of joining wooden springs.

FIG. 13 shows an embodiment of a solution of joining the wooden springs, wherein the average diameter d2 of the upper end portions 503, 504 of the wooden springs 501, 502 is smaller than the average diameter dl of the wooden springs 501, 502, and the portion 504 of the smaller mean diameter d2 of the lower wooden spring 502 is partially compressed into the upper wooden spring 501. In this way, 2-1000 wooden springs can be connected in series, which in the case of a longer composite wooden spring are, for example, wound into a roll, and the user can easily separate sections of the timber spring by pulling.

Figure 14:
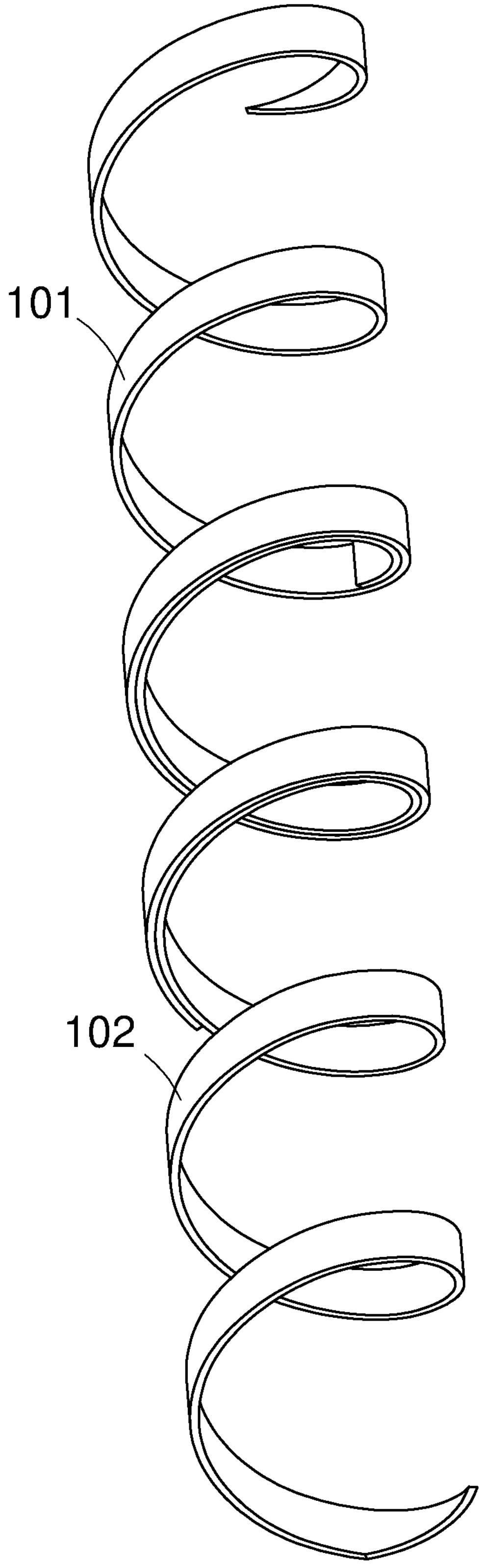
FIG. 14 shows an isometric view of another embodiment, wherein two wooden springs are joined.

FIG. 14 shows another embodiment, wherein two wooden springs are joined, wherein the two springs 101 and 102 are partially pushed into each other with their ends.

Figure 17:
FIG. 17 shows a side view of an embodiment of the wooden fabric interlaced of the wooden springs having a circular cross-sectional shape.
Figure 15:
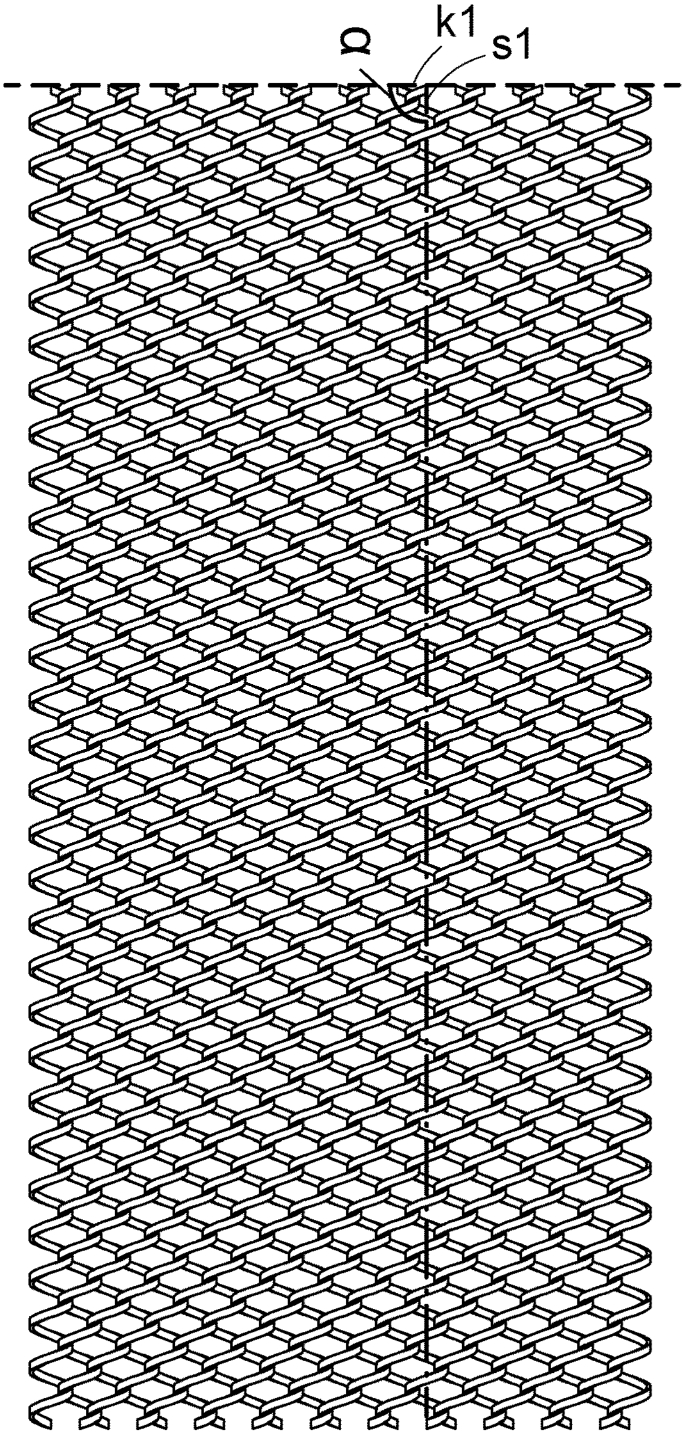
FIG. 15 shows a top view of an embodiment of a wooden fabric interlaced of the wooden springs having a circular cross-sectional shape.
Figure 16:
FIG. 16 shows an end view of the embodiment of the wooden fabric interlaced of the wooden springs having a circular cross-sectional shape.

FIG. 15-17 show an embodiment of a fabric material cross-woven from wooden springs with a circular cross-sectional shape. The wooden springs are interlaced together with two side wooden springs, forming an interlaced fabric of wooden springs.

Figure 20:
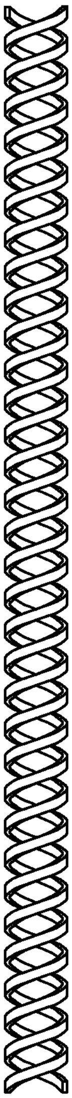
FIG. 20 shows a side view of an embodiment of the wooden fabric interlaced of the wooden springs having an elliptical cross-sectional shape.
Figure 18:
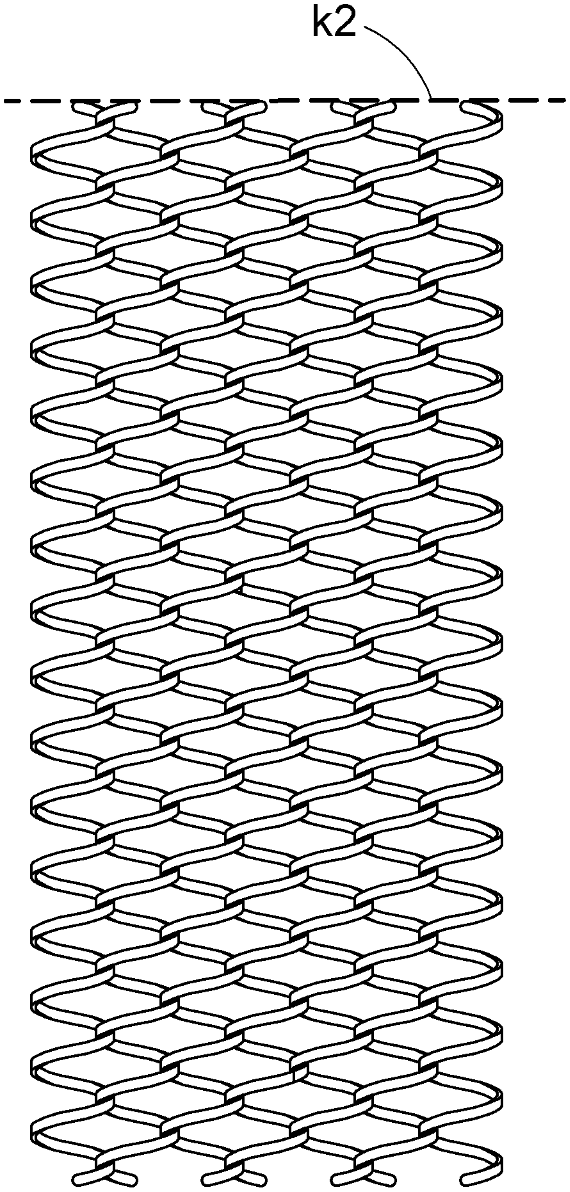
FIG. 18 shows a top view of an embodiment of a wooden fabric interlaced of the wooden springs having an elliptical cross-sectional shape.
Figure 19:
FIG. 19 shows an end view of an embodiment of the wooden fabric interlaced of the wooden springs having the elliptical cross-sectional shape.

FIG. 18-20 show an embodiment of a cross-woven fabric with an elliptical cross-sectional shape, which differs from the previous embodiment in that the cross-sectional shape of the wooden springs is elliptical.

Figure 23:
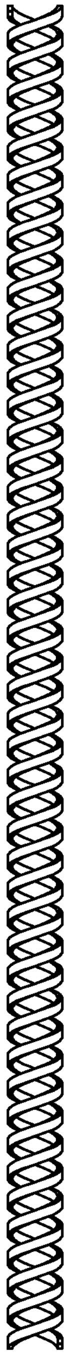
FIG. 23 shows a side view of an embodiment of the wooden fabric interlaced of the wooden springs having the chain link-shaped cross-sectional shape.
Figure 21:
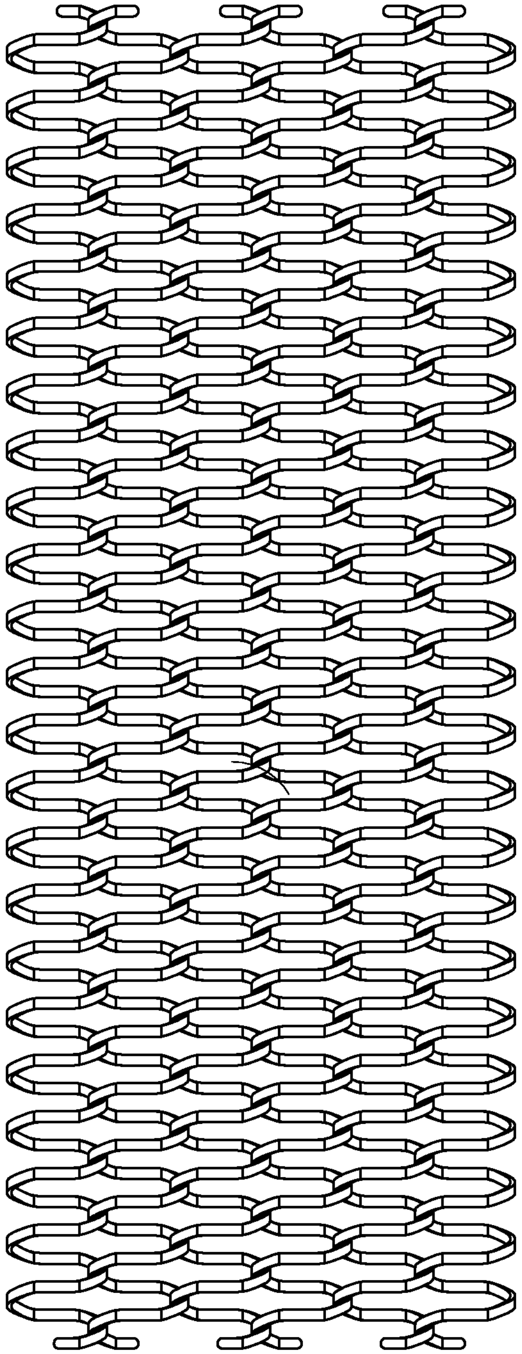
FIG. 21 shows a top view of an embodiment of a wooden fabric interlaced of the wooden springs having a chain link-shaped cross-sectional shape.
Figure 22:
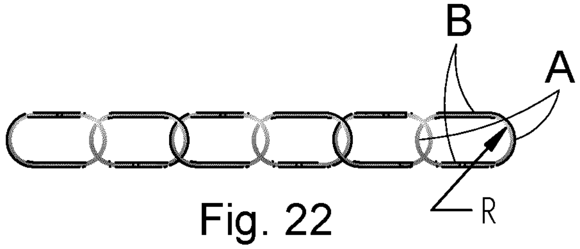
FIG. 22 shows an end view of an embodiment of the wooden fabric interlaced of the wooden springs having the chain link-shaped cross-sectional shape.

FIG. 21-23 show an embodiment of a cross-woven fabric of wooden springs with a chain-link shaped cross-sectional shape, which differs from other embodiments in that the distribution profiles of the wooden springs are chain-link shaped.

Figure 24:
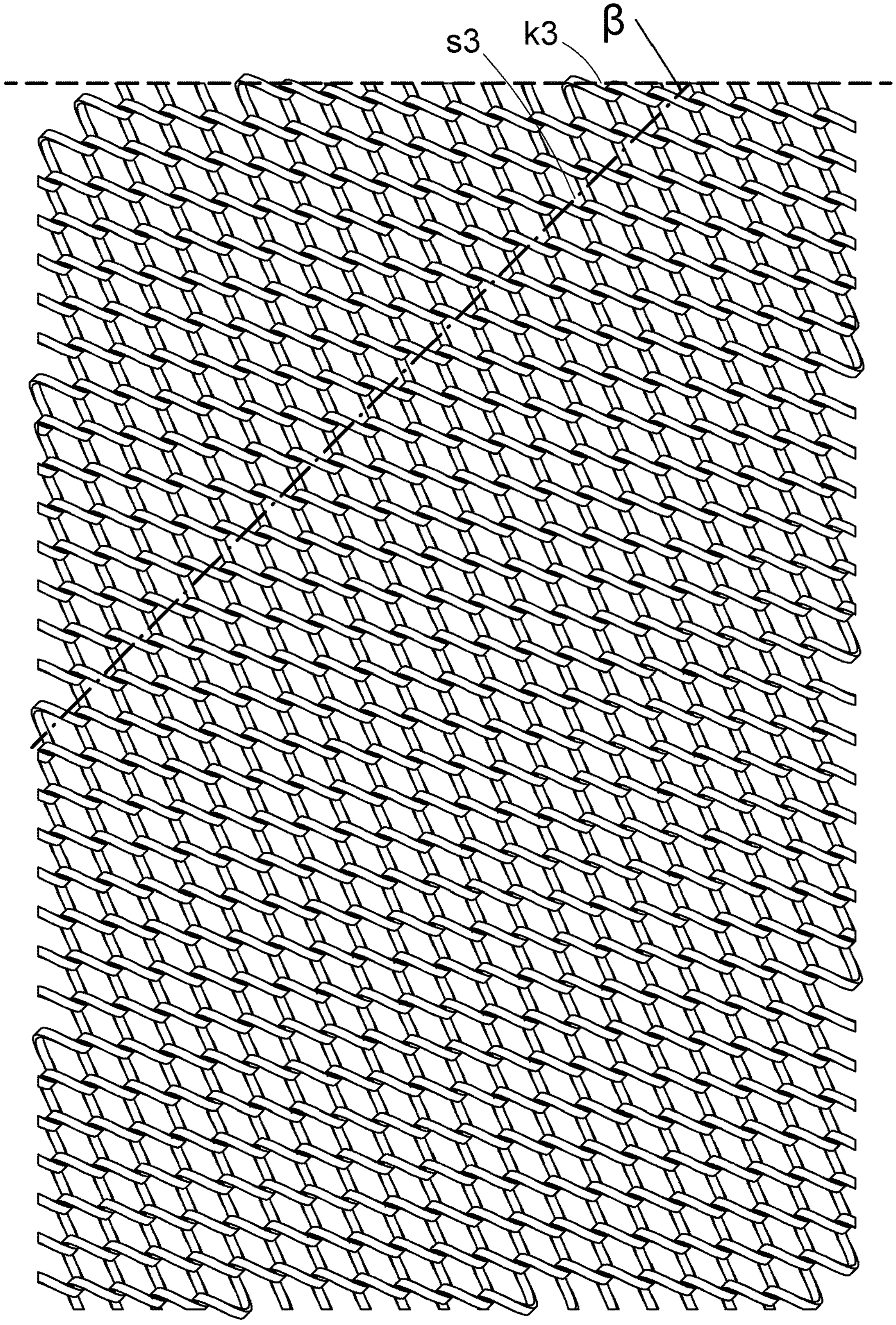
FIG. 24 is a top view of an embodiment of the wooden fabric interlaced of inclined wooden springs having the circular cross-sectional shape.

FIG. 24 shows an embodiment of the wooden springs having circular cross-sectional shape, an embodiment of the wooden fabric interlaced of inclined wooden springs, that differs from the previous embodiments in that the wooden springs are interlaced at an angle.

Figure 27:
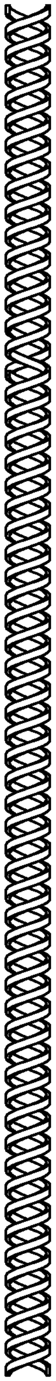
FIG. 27 shows a side view of an embodiment of the wooden fabric longitudinally interlaced of the wooden springs having the circular cross-sectional shape.
Figure 25:
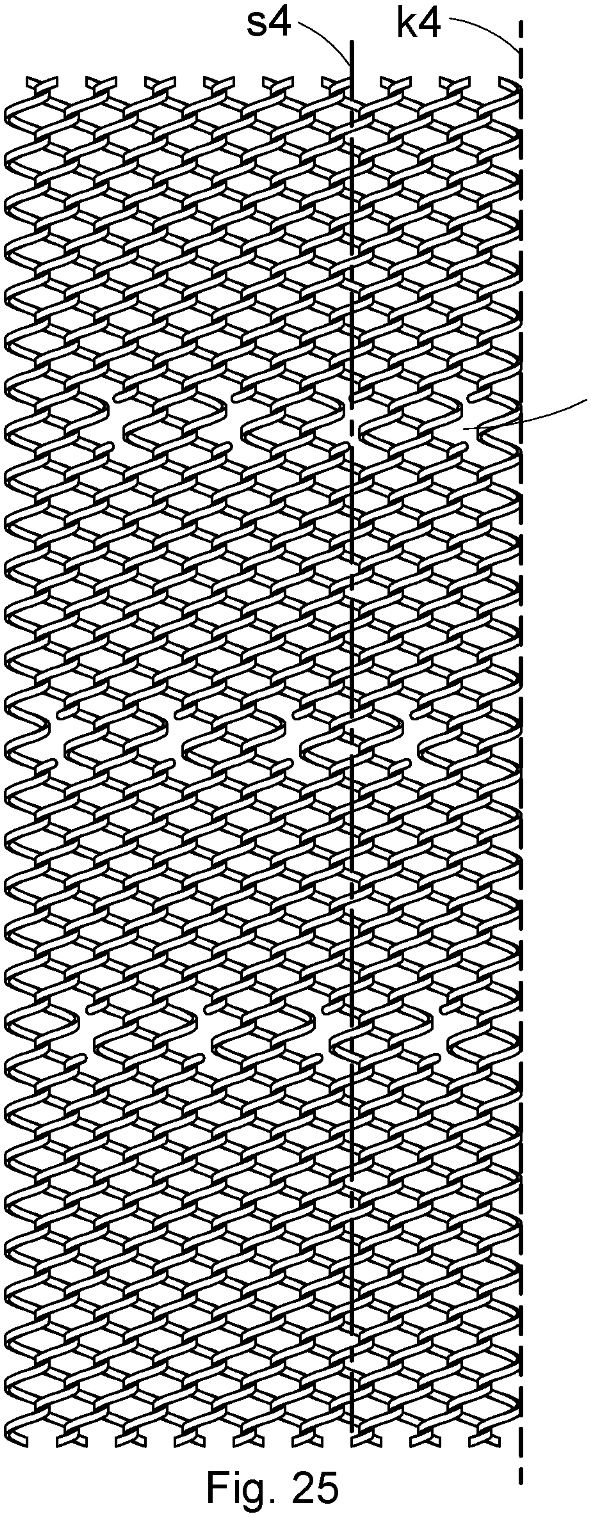
FIG. 25 shows a top view of an embodiment of the wooden fabric lengthwise interlaced of the wooden springs having the circular cross-sectional shape.
Figure 26:
FIG. 26 shows an end view of an embodiment of the wooden fabric longitudinally interlaced of the wooden springs having the circular cross-sectional shape.

FIG. 25-27 show an embodiment of a wooden spring having a circular cross-sectional shape, embodiment of longitudinally interlaced wooden fabric, which differs from the previous embodiments in that the wooden springs are longitudinally interlaced.

Figure 28:
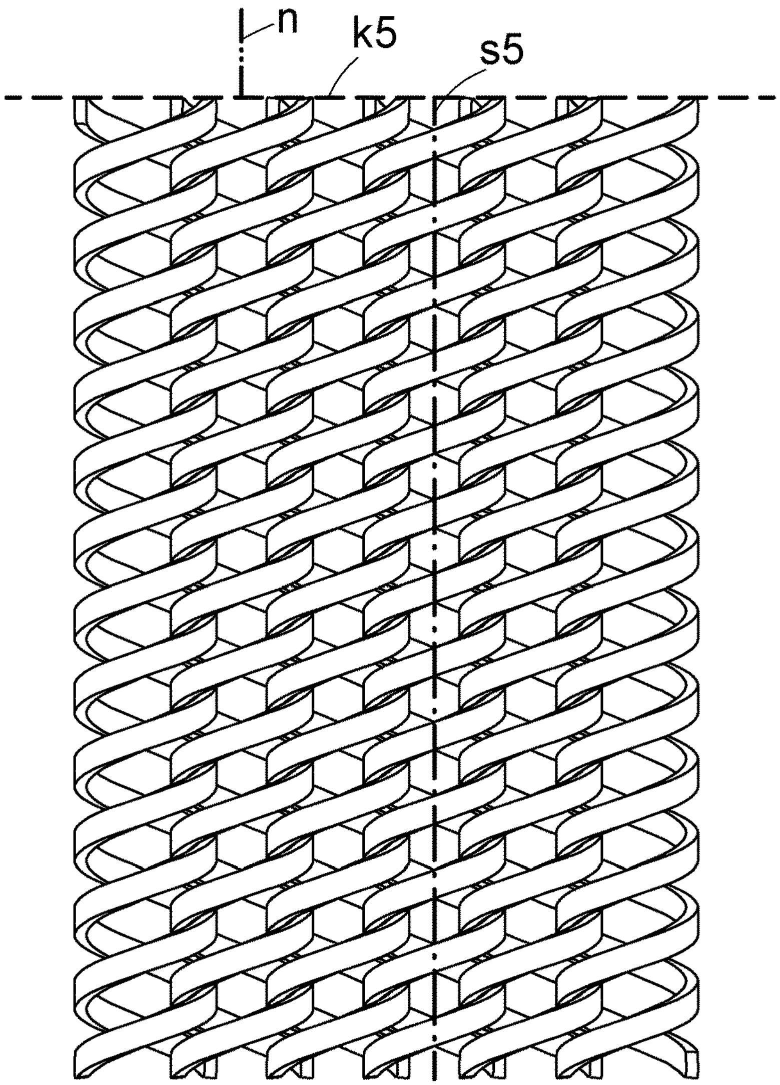
FIG. 28 shows a top view of an embodiment of the wooden fabric normal interlaced of the wooden springs having the circular cross-sectional shape.
Figure 29:
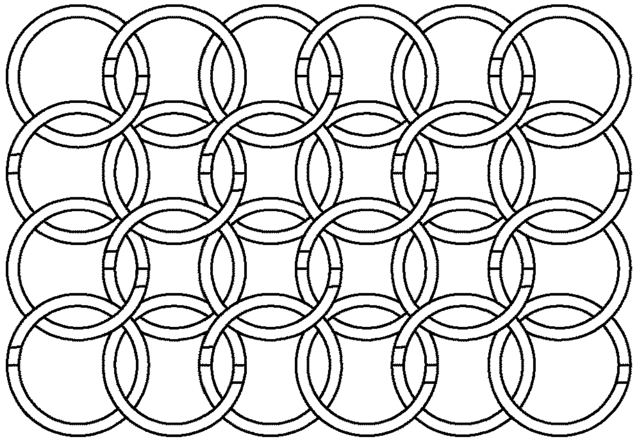
FIG. 29 shows an end view of the embodiment of the wooden fabric normal interlaced of the wooden springs having the circular cross-sectional shape.
Figure 30:
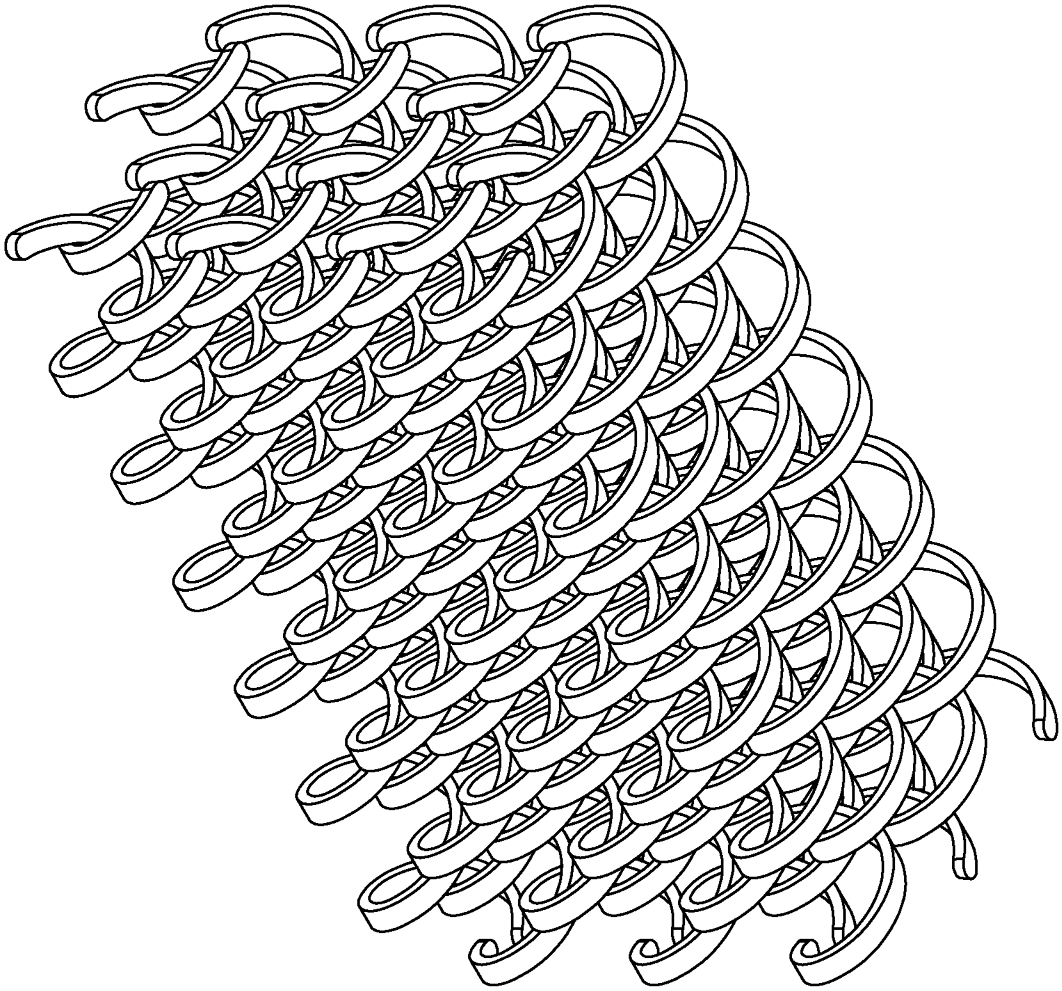
FIG. 30 shows an isometric view of the embodiment of the wooden fabric normal interlaced of the wooden springs having the circular cross-sectional shape.
Figure 32:
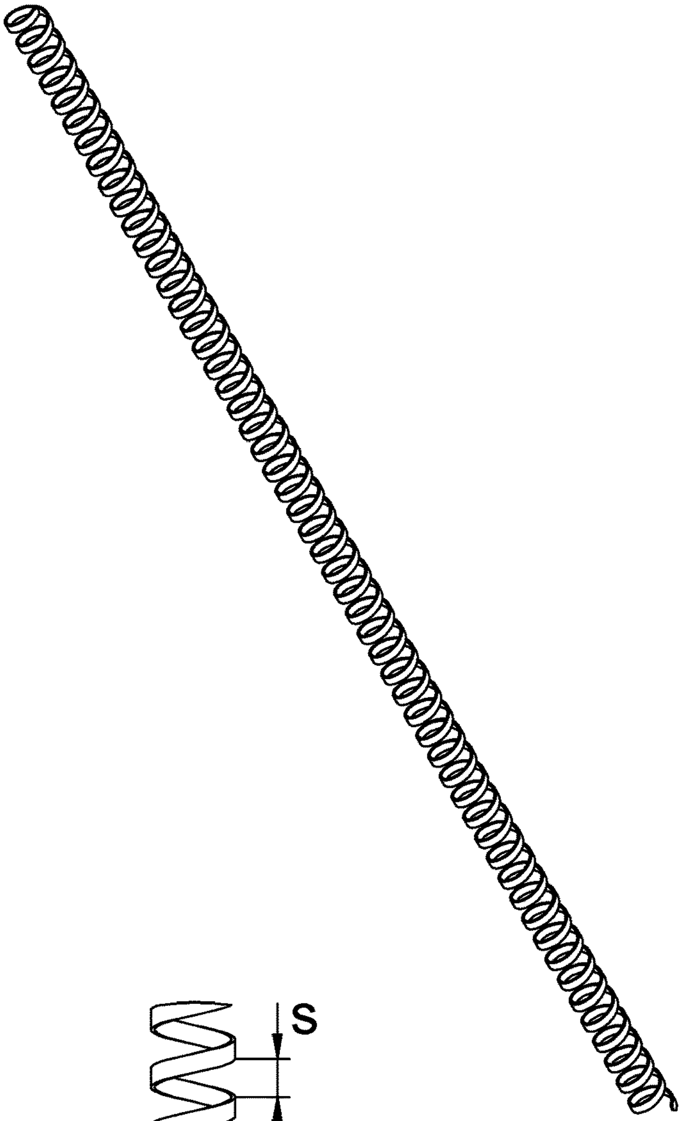
FIG. 32 shows an isometric view of the single wooden spring having the circular cross-sectional shape.
Figure 31:
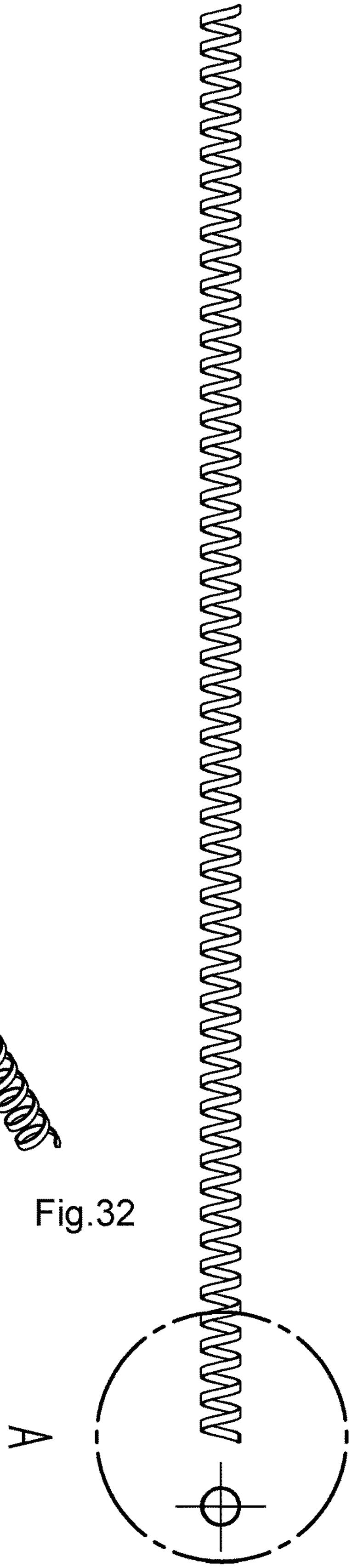
FIG. 31 shows a top view with an end view of a single wooden spring having the circular cross-sectional shape.
Figure 33:
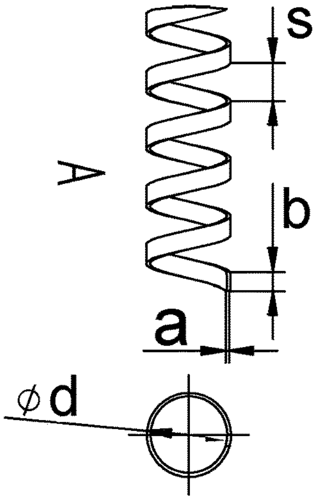
FIG. 33 shows an enlarged top view with an end view of a section of the single wooden spring having the circular cross-sectional shape.

FIGS. 28 and 29 show an embodiment of the wooden fabric normal interlaced of the wooden springs having the circular cross-sectional shape, which differs from the previous embodiments in that the wooden springs are interlaced with each other by normal interlacing.

FIG. 30-33 show a wooden spring from which wooden spring fabrics can be made. A thickness a of a coils the wooden springs a is 0.2-2.0 mm, preferably 0.4-0.6 mm, width b is 1-10 mm, preferably 3-6 mm, stretched out length l 0.1-5 meters (m), preferably 0.5-2 m. The wooden springs are made in helical, i.e., tension spring shape using the method for making the wooden spring. The outer diameter of the coils of the wooden springs d is 6-60 mm, preferably 7-12 mm and the pitch of the coils of the wooden springs is 4-40 mm, preferably 5-10 mm.

Figure 34:
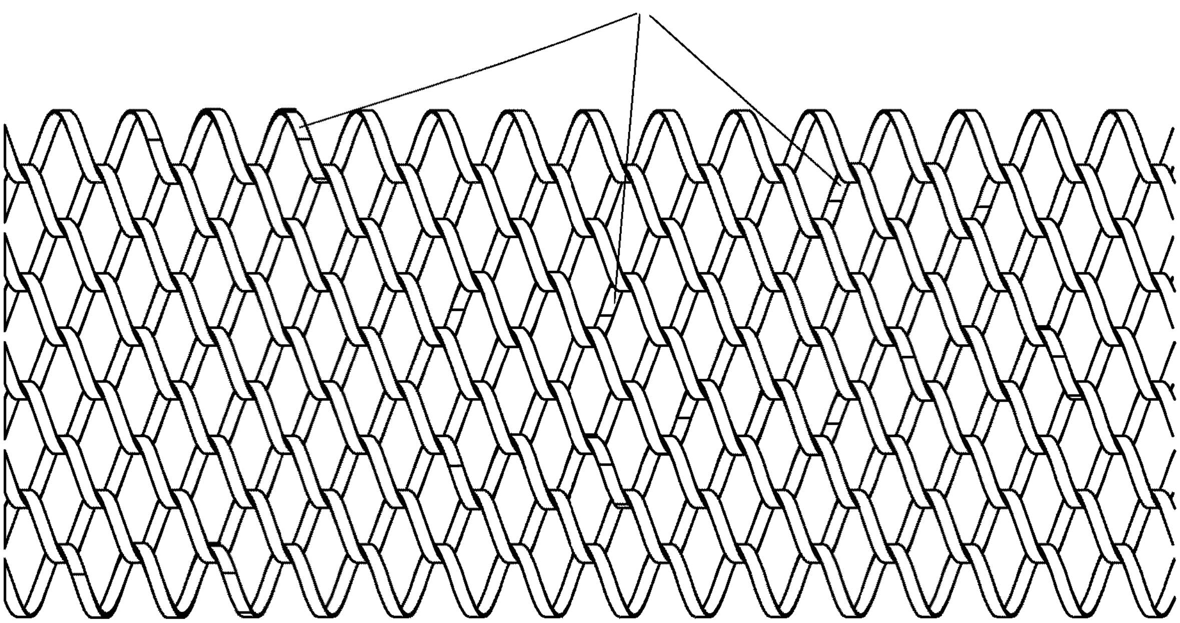
FIG. 34 shows a top view of an embodiment, wherein the wooden fabric is formed of multiple wooden springs joined.

FIG. 34 shows an embodiment of wooden spring fabric interlaced of wooden springs joined to each other, wherein 103 refers to joints within the wooden spring fabric.

Figure 35:
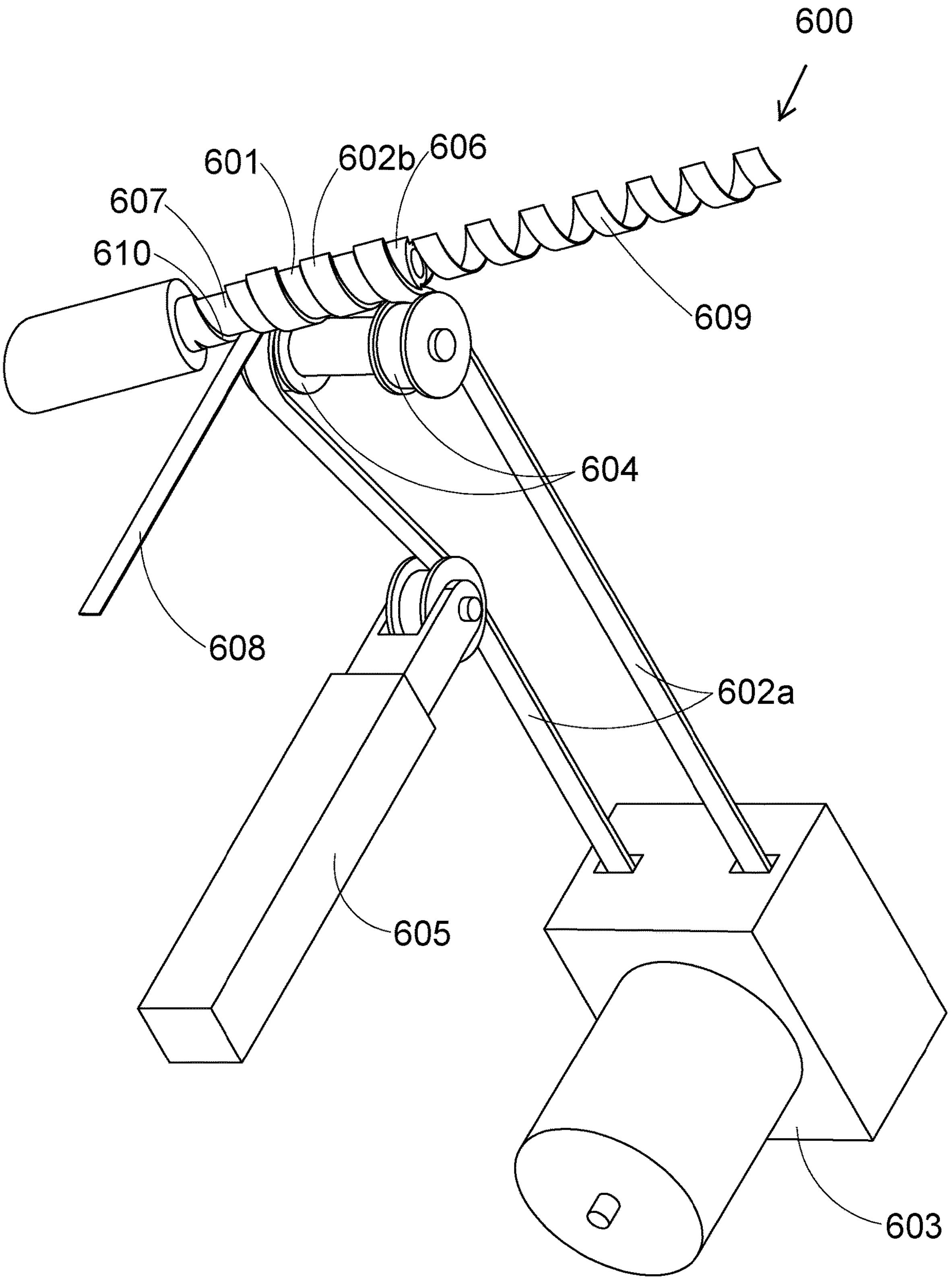
FIG. 35 shows a helical dryer for making the wooden spring according to an embodiment of the present disclosure.

FIG. 35 shows a helix dryer for making the wooden spring according to an embodiment of the present disclosure, wherein the helical dryer 600 comprises a tubular spring forming means 601, a heat source inside the tubular spring forming means 601, a drive mechanism adapted to drag a strip of wood 608 along the tubular spring forming means to wind the strip of wood into a wooden spring 609, wherein the drive mechanism comprises a belt 602*a*, 602*b* attached around the tubular spring forming means 601 and a belt drive 603 adapted to move the belt 602*a*, 602*b* along the spring shape forming means 601 and wherein the helix dryer further comprises a belt guide 604 and a belt tensioner 605. The tubular spring forming means 601 comprises a helical groove 606 formed on an outer surface of the tubular spring forming means, wherein the helical groove 606 having a bottom 607 and a side 610.

The present disclosure is not limited to the embodiments shown in the figures and in the above embodiments, but may be embodied in other embodiments within the scope of the appended claims. The present disclosure is not limited to the embodiments shown in the drawings and the above embodiments, but includes terms referring to alternative embodiments and all possible combinations of embodiments with "circular cross-sectional shape", "elliptical cross-sectional shape", "chain-link shaped cross-sectional shape", "normal braided", "cross-braided", "longitudinally interlaced".

The invention claimed is:

1. A wooden spring formed of a strip of wood for forming wooden spring fabric, wherein the wooden spring has a homogeneous shape, the wooden springs are interlaceable side by side with at least two other wooden springs and the wooden spring comprises:

- a helix having a first end and a second end, wherein the first end has a diameter and the second end has a diameter, and
- a plurality of coils between the first end and the second end of the helix, wherein:
  - an average thickness of the helix is 0.2 to 2.0 millimeters (mm);
  - an average width of the helix is 2 to 10 mm;
  - an average diameter of the coil is 6 to 60 mm;
  - an average pitch of the coil is 4 to 40 mm; and
  - a stretched-out length of the wooden spring is 10 to 5000 mm.

2. The wooden spring according to claim 1, wherein the average width is greater than an average distance between the two coils being side by side.

3. The wooden spring according to claim 1, wherein a position of the first end is different than a position of the second end, and wherein the wooden spring comprises at least one of the following:

- a distance of the first end or the second end from a first coil is less than the average pitch;
- the first end is at least partially turned onto an outer side of the wooden spring;
- the second end is at least partially turned onto an outer side of the wooden spring;
- the first end is at least partially turned onto an inner side of the wooden spring; or
- the second end is at least partially turned onto an inner side of the wooden spring.

4. The wooden spring according to claim 1, wherein the average diameter of the first end of the wooden spring is smaller than the average diameter of the second end of the wooden spring.

5. The wooden spring according to claim 1, wherein the wooden spring comprises one or more breaking markers.

6. The wooden spring according to claim 1, wherein a cross-sectional shape of the wooden spring is circular, elliptical, or chain-linked shaped.

7. A helix dryer for making a wooden spring having a homogeneous shape, wherein the wooden springs are interlaceable side by side with at least two other wooden springs for forming wooden spring fabric, the helix dryer comprising:

- a tubular spring forming means having a first end and a second end and comprising a helical groove formed on an outer surface of the tubular spring forming means;
- a heat source adapted to heat the tubular spring forming means to 60 to 300 degrees Celsius; and
- a drive mechanism comprising one or more transmission means, in the form of a belt or chain, attached around the tubular spring forming means and a drive adapted to move the one or more transmission means along the helical groove of the spring shape forming means to drag a strip of wood between the transmission means and a bottom of the helical groove of the tubular spring forming means and to pull the strip of wood along the helical groove and wind the strip of wood into a wooden spring.

8. The helix dryer according to claim 7, wherein the heat source is adapted to heat the tubular spring forming means at least from inside of the tubular spring forming means or outside the tubular spring forming means.

9. The helix dryer according to claim 7, wherein the helix dryer further comprises sanding mechanism.

10. A method for making a wooden spring for forming wooden spring fabric, wherein the wooden springs are interlaced with at least two side by side wooden springs to form a wooden spring fabric, the method comprising:

- cutting from a wood material a strip of wood;
- automatically determining a category of the strip of wood, controlled by a machine vision system, wherein the determining comprises:
  - obtaining a digital information of the strip of wood by photographing the strip of wood;
  - analyzing the digital information in an automated sorting system by a machine vision; and
  - based on the analyzed digital information, allocating to the strip of wood one or more categories and sorting the strip of wood based on the allocated one or more categories, by the automated sorting system;

feeding a first end of the strip of wood into a helix dryer pre-heated to 60 to 300 degrees Celsius; and drying the strip of wood at least partially, by dragging the strip of wood at least partially along a tubular spring forming means of the helix dryer.

11. The method according to claim 10, wherein the method further comprises pre-moistening the wood material.

12. The method according to claim 10, wherein the method further comprises sanding surfaces of the strips of wood or sanding surfaces of the wooden spring.

13. A wooden spring fabric comprising the wooden springs according to claim 1, wherein two or more side-by-side wooden springs are interlaced to each other through the coils of the wooden springs.

14. The wooden spring fabric according to claim 13, wherein the interlaced wooden springs form a multi-layered and/or multi-columnar wooden spring fabric.

15. The wooden spring fabric according to claim 13, wherein axes of the wooden springs in respect of the side of the wooden fabric is at angle $\alpha$ 70 to 115 degrees or angle $\beta$ 25 to 65 degrees.

16. The wooden spring fabric according to claim 13, wherein axes of the wooden springs are oriented in a direction of a longer side of the wooden fabric or oriented in a direction of a normal of a side surface of the wooden spring fabric.

17. A use of the wooden spring fabric according to claim 13 for packing material, for package filling material, for packaging, for making a curtain, for making a mattress, or for making an interior or design elements.

18. The wooden spring according to claim 1, wherein the wooden spring is made of one or both of wood or an at least partially woody material.

19. The wooden spring according to claim 18, wherein the at least partially woody material includes bamboo.

20. The wooden spring according to claim 18, wherein the at least partially woody material includes reed.

* * * * *